United States Patent
Thielbeer et al.

(10) Patent No.: US 11,479,635 B2
(45) Date of Patent: Oct. 25, 2022

(54) OXIDIC SILICON PARTICLE DISPERSION IN POLYOL

(71) Applicant: BASF SE, Ludwigshafen am Rhein (DE)

(72) Inventors: Frank Thielbeer, Ludwigshafen (DE); Christian Koenig, Ludwigshafen (DE); Amir Doroodian, Lemfoerde (DE); Heinz-Dieter Lutter, Lemfoerde (DE); Sebastian Richter, Lemfoerde (DE); Udo Hadick, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 517 days.

(21) Appl. No.: 16/478,588

(22) PCT Filed: Jan. 25, 2018

(86) PCT No.: PCT/EP2018/051789
§ 371 (c)(1),
(2) Date: Jul. 17, 2019

(87) PCT Pub. No.: WO2018/141614
PCT Pub. Date: Aug. 9, 2018

(65) Prior Publication Data
US 2020/0040127 A1   Feb. 6, 2020

(30) Foreign Application Priority Data
Jan. 31, 2017 (EP) .................................... 17154041

(51) Int. Cl.
| C08G 18/08 | (2006.01) |
| C08G 18/10 | (2006.01) |
| C08G 18/38 | (2006.01) |
| C08G 18/46 | (2006.01) |
| C08G 18/48 | (2006.01) |
| C08G 18/71 | (2006.01) |
| C08G 63/695 | (2006.01) |
| C08G 63/85 | (2006.01) |
| C08J 9/04 | (2006.01) |
| C08G 101/00 | (2006.01) |

(52) U.S. Cl.
CPC ......... C08G 18/3895 (2013.01); C08G 18/10 (2013.01); C08G 18/48 (2013.01); C08G 18/718 (2013.01); C08G 63/695 (2013.01); C08G 2101/00 (2013.01)

(58) Field of Classification Search
CPC ............ C08G 18/3895; C08G 18/4692; C08G 18/5096; C08G 63/695
See application file for complete search history.

(56) References Cited

U.S. PATENT DOCUMENTS

| 8,901,186 B2 | 12/2014 | Eling et al. |
| 9,403,932 B2 | 8/2016 | Eling et al. |
| 2005/0043425 A1 | 2/2005 | Beck et al. |
| 2011/0266497 A1 | 11/2011 | Eling et al. |
| 2011/0313070 A1 | 12/2011 | Eling et al. |
| 2012/0065341 A1* | 3/2012 | Eling ................ C08G 18/4238 525/424 |
| 2016/0152761 A1 | 6/2016 | Wettach et al. |
| 2016/0264710 A1* | 9/2016 | Eling ................ C08G 18/4238 |

FOREIGN PATENT DOCUMENTS

| CN | 101020751 A | 8/2007 |
| CN | 101469068 A | 7/2009 |
| CN | 100549116 C | 10/2009 |
| CN | 1022549116 C | 11/2011 |
| CN | 102387991 A | 3/2012 |
| CN | 104212406 A | 12/2014 |
| DE | 103 38 164 A1 | 3/2005 |
| DE | 10 2011 078 170 A1 | 12/2011 |
| EP | 1 366 112 A1 | 12/2003 |
| JP | 2014062167 A * | 4/2014 |
| WO | WO 2010/043530 A1 | 4/2010 |
| WO | WO 2011/072056 A2 | 6/2011 |

OTHER PUBLICATIONS

Machine translation of JP-2014062167-A obtained from Clarivate Analytics in Nov. 2021 (Year: 2021).*
International Search Report dated Apr. 23, 2018, in PCT/EP2018/051789 filed on Jan. 25, 2018.
International Preliminary Report on Patentability completed on Jan. 23, 2019, in PCT/EP2018/051789 filed on Jan. 25, 2018.
Chinese Office Action dated Oct. 29, 2021 in Chinese Application No. 201880009334.1, 5 pages.
"Encyclopedia of Chemical Technology, vol. 9, Polymerization Mechanism and Process—Space Chemistry", Editorial Committee of Encyclopedia of Chemistry, Chemical Industry Press, Jun. 1995, p. 165.
"Handbook of Chemical formulation and technology", Deng Shunyang, Shanghai Scientific and Technological Literature Press, Jan. 2003, p. 824.

* cited by examiner

Primary Examiner — Melissa A Rioja
(74) Attorney, Agent, or Firm — Grüneberg and Myers PLLC

(57) ABSTRACT

A graft macromer, comprising the reaction product of at least one macromer being at least one molecule which comprises in its structure one or more hydroxyl-terminated polyether and/or polyester chains, with at least one grafting compound which comprises in its structure at least one at least monoalkoxylated or at least monohalogenated silyl group and at least one alkyl, cycloalkyl or aryl containing group which is reactive towards the hydroxyl group of the macromer, is used for dispersing e.g. $SiO_2$ in a polyol.

16 Claims, No Drawings

OXIDIC SILICON PARTICLE DISPERSION IN POLYOL

The present invention relates to graft macromers, their use as stabilizer for oxidic silicon particles in polyols, corresponding dispersions, processes for their preparation, the use for preparing polyurethanes as well as respective processes and polyurethanes.

It is known that the mechanical properties of polyurethane materials can be improved by including nanoparticles in the isocyanate or polyol component.

Thus, DE-A 103 38 164 discloses a process for producing a polyurethane foam, which comprises reacting a polyisocyanate and a polyol in the presence of a blowing agent and of silica gel particles, with the silica gel particles being functionalized with aminopropyltriethoxysilane. The silanizing reagent makes the particle surface of the silica gel particles hydrophilic, with this hydrophilic surface having surface groups which are reactive toward isocyanate. As a result, the particles are covalently bound into the polymer matrix of the foam during the polymerization reaction to form the polyurethane form and act as reinforcing material. This enables the proportion of open cells in the polyurethane foam to be regulated, which can lead to an improvement in the acoustic properties (sound damping) and the thermal insulation capability of the polyurethane foam. The surface-functionalized $SiO_2$ particles are incorporated into the polyol component. The $SiO_2$ particles are preferably produced from tetraethoxysilane in an organic solvent. This synthetic route is costly since an expensive precursor is used and, in addition, the particle yield in the synthesis is low. Furthermore, this synthesis gives particles having a size of 100 nm or more, which can be considered to be conventional fillers.

EP-A 1 366 112 discloses a process for producing a silicon dioxide dispersion by a) initial charging of an aqueous silicate solution, b) polycondensation of the silicate to a particle size of from 3 to 50 nm, c) adjustment of the silica sol obtained to an alkaline pH, d) optionally concentration of the sol, e) mixing of the sol with constituents of the outer, flowable phase of the dispersion and f) optionally removal of water and/or other solvent constituents from the dispersion. Outer flowable phases mentioned are polyols, polyamines, linear or branched polyglycol ethers, polyesters and polylactones. In the examples, a silica sol whose pH has been set to 10.5 to 11 is mixed with isopropanol and the water is removed to a content of <0.1% by atmospheric distillation. Various polyethers are then added while stirring. The volatile constituents are subsequently removed by distillation at 50° C. under reduced pressure. Mention is made of the use of the silicon dioxide dispersions for the production of closed-cell or open-cell foams based on polyurethanes, polysiloxanes, polyolefins or polystyrene. The sols have a pH of from 10 to 12 and are therefore difficult to handle. The sols have only a low concentration of silicon dioxide particles (up to 15 parts of $SiO_2$ particles per 100 parts of sol). Relatively large amounts of solvent are required, which makes the production of the silicon dioxide dispersions relatively expensive. WO 2010/043530 discloses a method for producing polyol dispersions containing an aqueous silica sol having an average particle diameter of 1 to 150 nm. The aqueous silica sol is mixed with an organic diluent and a polyol as well as a compound having alkoxylated silyl groups and groups which are active towards an alcohol. According to example D3, an aqueous silica sol is mixed with isopropanol and trimethoxysilane obtained by reaction of 3-(2,3-epoxypropoxy)propyltrimethoxysilane and Jeffamine® XTJ-505. After the reaction, a polyol was added.

The object underlying the present invention is to provide stable dispersions of oxidic silica particles having an average particle size in the μm-range in polyols. By employing this dispersion in the preparation of polyurethanes, the hardness of the system shall preferably be increased.

The object is achieved according to the present invention by a graft macromer, comprising the reaction product of at least one macromer being at least one molecule which comprises in its structure one or more hydroxyl-terminated polyether and/or polyester chains, with at least one grafting compound which comprises in its structure at least one at least monoalkoxylated silyl group and at least one alkyl, cycloalkyl or aryl containing group which is reactive towards the hydroxyl group of the macromer.

The object is furthermore achieved by the use of this graft macromer as a stabilizer for oxidic silicon particles selected from the group consisting of silicon dioxide, silicates, silicic acid and mixtures thereof in polyols.

The object is furthermore achieved by a dispersion comprising the graft macromer reacted with the oxidic silicon particles in at least one polyol. Preferably, the polyol is different (in structure) from the graft macromer. Thus, even if non-reacted graft macromer remains in the dispersion, it can be distinguished from the at least one polyol by its different structure. Consequently, the polyol is not identical with the graft macromer.

The object is furthermore achieved by a process for preparing this dispersion comprising the step of reacting the graft macromer with the oxidic silicon particles in the at least one polyol.

The object is furthermore achieved by the use of this dispersion for preparing a polyurethane.

The object is furthermore achieved by a process for preparing a polyurethane comprising this dispersion with polyisocyanates and, if appropriate, one or more of further compounds having hydrogen atoms which are reactive towards isocyanates, chain extenders and/or crosslinkers, catalysts, blowing agents and further additives, and reacting the mixture to form the polyurethane.

The object is furthermore achieved by a polyurethane, obtainable by this process.

According to the present invention, it has been found that by employing graft monomers which can be directly reacted with oxidic silicon particles and thereby covalently linked with the oxidic silicon particles storage stable dispersions in polyols can be obtained which can be advantageously employed for preparing polyurethanes having an increased hardness.

According to the present invention, it is not necessary to employ organic solvents which must be separated after the preparation of the graft macromer or dispersion. In contrast to WO 2010/043530, not silica sols are employed but oxidic silicon particles having preferably a particle size in the μm-range, preferably an average particles size ($d_{50}$) in the range of from 0.1 to 100 μm, more preferably 0.5 to 20 μm most preferably 1 to 10 μm. The particle size can be determined by measuring the size of a certain number of particles by hand or by employing suitable analytic tools, e.g. a camsizer. Typically, at least 100 discrete particles are measured in order to obtain the $d_{50}$ value. The average particle size ($d_{50}$) is preferably the arithmetic mean diameter (d).

Preferably, particle sizes are determined by static laser diffraction using a Mastersizer 2000 (Malvern Instruments Ltd) after dilution of the sample with isopropanol in order to obtain an optical concentration suitable for the measurement. For the dispersion of the sample a dispersing module Hydro SM was used with a stirrer speed of 2500 rpm. The calculation of the particle size distribution may be performed by the Mastersizer 2000 using Fraunhofer theory.

The oxidic silicon particles are preferably silicon dioxide (silica), silicates, silicic acids or mixtures thereof, preferably silicon dioxide particles or aluminium silicate particles.

According to the present invention, the amount of oxidic silicon particles which can be included in a stable dispersion can be high. Preferably, the amount of oxidic silicon particles, based on the polyol dispersion is in the range of from 5 to 60 wt %, more preferably from 15 to 45 wt %.

Due to the larger particle size of the oxidic silicon particles, the degree of functionalization can be lower than according to the prior art for the nm-scale particles.

When silicon dioxide or silicates are mixed with polyols, they typically separate after a short time, and stable dispersions cannot be obtained. In order to obtain stable dispersions, a stabilizer is necessary. In this disclosure, the term "stabilizer" refers, in a general sense, to a chemical compound. The stabilizer is a compound that is assumed to stabilize dispersions of silicon dioxide or silicate particles in polyols and thus is assumed to stabilize polyol dispersions. This allows for a phase-interaction between silicon-containing particles and polyol, so that a stable dispersion is achieved and precipitation of the particles is prevented. The macromer employed according to the present invention interacts both with the silicon-containing particles and the continuous polyol phase. A general definition and description of macromers can be found in DEA-A10 2011 078 170.

The macromer is defined as a molecule which comprises in its structure one or more hydroxyl-terminated polyether and/or polyester chains which can be reactive with a grafting compound in order to form the graft macromer.

Typical polyols which are used to synthesize macromers comprise polyether or polyester polyols, more preferably polyetherols or polyesterols which can be commonly manufactured. Usually, macromers are synthesized from polyols and alkylene oxides in the presence of basic (for polyethers) or Lewis acid catalysts (for polyesters).

Suitable basic catalysts are alkali metal hydroxides or alkali metal alkoxides, as discussed below.

The suitable Lewis acid catalysts generally comprise tin-based, boron-based, aluminium-based, gallium-based, rare earth-based, zinc-based, or titanium-based compounds.

Representative tin-based compounds include: Dibutyltin diacetate, Dibutyltin, dibromide, Dibutyltin dichloride, Dibutyltin dilaurate, Dibutyltin dimethoxide, Dibutyltin oxide, Dimethyltin diacetate, Dimethyltin dibromide, Diphenyltin dichloride, Diphenyltin oxide, Methyltin trichloride, Phenyltin trichloride, Tin(IV) acetate, Tin(IV) bromide, Tin(IV) chloride, Tin(IV) iodide, Tin(II) oxide, Tin(II) acetate, Tin(II) bromide, Tin(II) chloride, Tin(II) iodide, and Tin(II) 2-ethylhexanoate (stannous octoate). Representative boron-based compounds include: Boron tribromide, Boron trichloride, Boron trifluoride, and tris(pentafluorophenyl)borane. Representative aluminium-based compounds include: Aluminium chloride and Aluminium bromide. Representative gallium-based compounds include: Gallium chloride, Gallium bromide, and Gallium(III) actylacetonate.

Representative rare earth catalysts are generally salts of Scandium, Yttrium, Lanthanum, Praseodymium, Neodymium, Erbium, Thulium, Ytterbium, Neodymium or Lutetium. Examples include: Ytterbium triflate, Ytterbium (III) actylacetonate, Erbium(III) trifluorosulfonate (erbium triflate), Erbium(III) actylacetonate, Holmium triflate, Terbium triflate, Europium triflate, Europium(III) trifluroacetate, Samarium triflate, Neodymium triflate, Neodymium (III) actylacetonate, Praseodymium triflate, Lanthanum (III) actylacetonate, Praseodymium triflate, and Dysprosium triflate. Representative zinc-based compounds include Zinc chloride and Zinc bromide. Representative titanium compounds include Titanium(IV) bromide and Titanium(IV) chloride.

The polyetherol or polyesterol forming the macromer can be the same as that forming the polyol phase of the final dispersion, and the same catalysts can be used for their preparation.

The polyol of the dispersion can be freely chosen. It has preferably an OH-number in the range of from 20 to 1000 and a functionality of 2 to 8. Examples of polyols are polyetherols, polyesterols, polyTHF, hydroxy functional polybutadienes, etc. Preferred are polyetherols and polyesterols.

The graft macromer according to the present invention allows for covalently linking to the oxidic silicon particles via the at least one at least monoalkoxylated silyl group. The at least one at least monoalkoxylated or at least monohalogenated silyl group is able to form a covalent bond with the particle surface of the oxidic silicon particles. Preferably, the silyl group contains two or three alkoxylations or halogen substituents, e.g. chloro substituents. Furthermore, the grafting compound preferably contains one or two, more preferably, one alkyl, cycloalkyl or aryl containing group which is reactive towards the hydroxyl group of the macromer. This group can be chosen from all groups that are reactive towards the hydroxyl group of e.g. a polyol forming a covalent linkage. Preferably, the grafting compound comprises in its structure at least one alkyl, cycloalkyl or aryl containing isocyanate or epoxide group, preferably isocyanate or glycidyl group. The alkyl residue contains preferably 1 to 10, more preferably 2 to 5 carbon atoms. The cycloalkyl group contains preferably 5 to 7 carbon atoms, the aryl group 6 to 12 carbon atoms.

Most preferably, the grafting compound is a ((tri-$C_{1-12}$-alkoxy)silyl)$C_{1-12}$-alkyl isocyanate. One example is (triethoxysilyl)propyl isocyanate.

The preparation of the graft macromer is preferably carried out in the presence of a catalyst. For binding isocyanate group containing molecules with the macromer, catalysts like dibutyltin dilaurate are typically employed.

The molecule which comprises in its structure one or more hydroxyl-terminated polyether and/or polyester chains is preferably selected from two- to eight-functional, preferably two- to six-functional polyether polyols and/or polyester polyols according to one embodiment of the invention of a molecular weight ($M_n$) of from 500 to 30,000 g/mol, preferably 10,000 to 25,000 g/mol. The molecular weight ($M_n$) can be determined by gel permeation, chromatography using polystyrene as standard and THF as eluent solvent.

The at least one macromer preferably has an OH-value of from 6 to 200 $mg_{KOH}/g_{macromer}$, preferably 10 to 100 $mg_{KOH}/g_{macromer}$, more preferably 15 to 70 $mg_{KOH}/g_{macromer}$.

The hydroxyl number is determined in accordance with DIN 53240 from 2012 (DIN="Deutsche Industrienorm", i.e. German industry standard).

The oxidic silicon particles are reactive with the graft macromer preferably in at least one polyol. The polyol can be the same or different from the macromer used for forming the graft macromer. The reaction is preferably carried out at a temperature in the range of from 0 to 160° C., more preferably 20 to 140° C., most preferably 80 to 120° C. The reaction can be carried out in the presence of a catalyst, e.g. titanium tetraisopropoxide or dibutyldiacetoxytin. Preferably, the reaction is carried out under constant stirring in order to obtain a finely divided dispersion.

The polyether polyols employed according to the present invention are prepared by known methods, for example from one or more alkylene oxides having from 2 to 4 carbon atoms in the alkylene radical by anionic polymerization using alkali metal hydroxides or alkali metal alkoxides as catalysts with addition of at least one polyol starter molecule, or by cationic polymerization using Lewis acids, such as antimony pentachloride or boron fluoride etherate. Suitable alkylene oxides are, for example, tetrahydrofuran, 1,3-propylene, oxide, 1,2- or 2,3-butylene oxide and preferably ethylene oxide and 1,2-propylene oxide.

Furthermore multi-metal cyanide compounds, known as DMC catalysts, can also be used as catalysts. The alkylene oxides can be used individually, alternately or in succession or as a mixture.

Possible starter molecules are two- to eight-functional alcohols, such as ethylene glycol, 1,2- and 1,3-propane diol, diethylene glycol, dipropylene glycol, 1,4-butane diol, glycerol or dimethylol propane, sugars, sorbitol or pentaeritritol.

Suitable molecular weight ranges for the polyester polyols employed for the purposes of the present invention are known per se to a person skilled in the art. According to another preferred embodiment, the molecular weight of the polyester polyol is in the range from 500 to 4000 g/mol, more preferably in the range from 800 to 3000 g/mol and most preferably in the range from 1000 to 2500 g/mol.

Particularly suitable polyester polyols for the purposes of the present invention have an OH number in the range from 25 to 230 mg KOH/g, more preferably in the range from 35 to 140 mg KOH/g and most preferably in the range from 40 to 115 mg KOH/g.

In the present invention, the polyester polyol is based on a polyhydric alcohol. Suitable polyhydric alcohols include, for example, polyhydric aliphatic alcohols, for example aliphatic alcohols having 2, 3, 4 or more OH groups, for example 2 or 3 OH groups. Suitable aliphatic alcohols for the purposes of the present invention include, for example, $C_2$ to $C_{12}$ alcohols, preferably $C_2$ to $C_8$ alcohols and most preferably $C_2$ to $C_6$ alcohols. It is preferable for the purposes of the present invention for the polyhydric alcohol to be a diol, and suitable diols are known per se to a person skilled in the art.

Suitable aliphatic $C_2$ to $C_6$ diols include, for example, ethylene glycol, diethylene glycol, 3-oxapentane-1,5-diol, 1,3-propanediol, 1,2-propanediol, dipropylene glycol, 1,4-butanediol, 1,5-pentanediol, 1,6-hexanediol, 2-methyl-1,3-propanediol and 3-methyl-1,5-pentanediol. It is further preferable for the polyhydric alcohol to be selected from the group consisting of 1,3-propanediol and 1,4-butanediol.

In one further embodiment, the present invention also provides a polyurethane as described above wherein the at least one polyhydric alcohol is selected from the group consisting of aliphatic $C_2$ to $C_6$ diols.

In one further embodiment, the present invention also provides a polyurethane as described above wherein the at least one polyhydric alcohol is selected from the group consisting of 1,3-propanediol and 1,4-butanediol.

It is also possible for the purposes of the present invention to employ a polyhydric alcohol at least partly obtained from renewable raw materials. The polyhydric alcohol in question may be partly or wholly obtained from renewable raw materials. It is also possible to employ a mixture of two or more polyhydric alcohols in the present invention. Where a mixture of two or more polyhydric alcohols is employed, one or more of the polyhydric alcohols employed may be at least partly obtained from renewable raw materials.

1,3-Propanediol may accordingly comprise synthetically produced 1,3-propanediol, but in particular 1,3-propanediol from renewable raw materials ("biobased 1,3-propanediol"). Biobased 1,3-propanediol is obtainable from maize (corn) and/or sugar for example. A further possibility is the conversion of waste glycerol from biodiesel production. In one further preferred embodiment of the invention, the polyhydric alcohol is a 1,3-propanediol at least partly obtained from renewable raw materials.

In one further embodiment, the present invention also provides a polyurethane as described above wherein the at least one polyhydric alcohol is a 1,3-propanediol at least partly obtained from renewable raw materials.

Alcohols having three or more OH groups can also be used to enhance the functionality of the polyester polyols. Examples of alcohols having three or more OH groups are glycerol, trimethylolpropane and pentaerythritol. It is also possible to use oligomeric or polymeric products having two or more hydroxyl groups. Examples thereof are polytetrahydrofuran, polylactones, polyglycerol, polyetherols, polyesterol or α,ω-dihydroxypolybutadiene.

The polyester polyol in the present invention is based not only on at least one polyhydric alcohol but also on a mixture of two or more dicarboxylic acids, wherein at least one of the two or more dicarboxylic acids is at least partly obtained from renewable raw materials. Suitable dicarboxylic acids for preparing polyester polyols are known per se to a person skilled in the art and described in US 2016/0152761.

The dispersion according to the present invention has preferably a viscosity in the range of from 500 to 100000 mPas, more preferably, 1000 to 50000 mPas.

The viscosity of the polyols is, unless indicated otherwise, determined at 25° C. in accordance with DIN EN ISO 3219 from 1994 by means of a Rheotec RC20 rotational viscometer using the spindle CC 25 DIN (spindle diameter: 12.5 mm; internal diameter of measuring cylinder: 13.56 mm), however at a shear rate of 100/1 s (instead of 50/1 s).

The molecular weight of a polyol in general may be calculated by the following formula: $M_n = f \times 56100/\text{OH-value}$, wherein $M_n$=number average molecular weight in g/mol, f=functionality, the number of OH groups per molecule, determined by the starter used to synthesize the macromer, OH-value=hydroxyl number of oligo-polyol in mg KOH/g.

Based on the oxidic silicon particles, preferably 0.1 to 20 wt % of graft macromer, more preferably 2 to 10 wt % of graft macromer are employed.

The dispersion according to the present invention preferably contains 0.05 to 10 wt %, more preferably 1 to 5 wt % of graft macromer and 5 to 60 wt %, more preferably 15 to 45 wt %, specifically 20 to 30 wt % of oxidic silicon particles, based on the total weight of the dispersion.

The dispersion is stable, which means that after 3 days of storage at 25° C. no deposition or precipitate can be visually determined.

By employing the oxidic silicon particles, the flammability and emissions such as VOC and FOG of the polyurethanes is reduced significantly.

The polyol dispersion stabilized by using at least one inventive stabilizer may be used for the production of polyurethanes (PU).

Usually, in the production of polyurethanes, at least one polyol is reacted with at least one polyisocyanate having on average at least 1.7, preferably at least 2 isocyanate groups, optionally in the presence of at least one blowing agent and/or catalyst.

A typical A-component in this PU production process consists of one or more polyols, one or more polyurethane catalysts, one or more surfactants, one or more crosslinkers, water or optionally other chemical or physical blowing agents. The B-component usually contains the isocyanates.

In another embodiment of the present invention, the polymer polyol comprising the inventive stabilizer may also be used to obtain a stable A-component in a PU production process, such that the A-component may be stored for a prolonged time without phase separation.

EXAMPLES

In the following sections, some experimental examples are given in order to illustrate some aspects of the present invention.

Examples A: Graft Macromers

1) Graft Macromer 1 for Use in Polyetherol Dispersion 500 g of a six-functional polyetherol (OH-value=18 $mg_{KOH}/g_{macromer}$ (determined by DIN 53240), BASF SE) was dried under vacuum (<10 mbar) at 90° C. for 1 h in a Büchi autoclave to remove residual moisture. The preparation proceeded by addition of 80 ppm dibutyl-tin dilaurate (Trigon Chemie) at 90° C. under constant stirring to form a homogenous mixture. Afterwards 11.2 g (1.5 mol equivalent) 3-(triethoxysilyl)propyl isocyanate were dropwisely added to the solution at this temperature within 30 min. After addition, the solution was stirred for another 3 h to yield the graft macromer 1.

2) Graft Macromer 2 for Use in Polyetherol Dispersion 500 g of a three-functional polyetherol (OH-value=28 $mg_{KOH}/g_{macromer}$ (determined by DIN 53240), BASF SE) was dried under vacuum (<10 mbar) at 90° C. for 1 h in a Büchi autoclave to remove residual moisture. The preparation proceeded by addition of 80 ppm dibutyl-tin dilaurate (Trigon Chemie) at 90° C. under constant stirring to form a homogenous mixture. Afterwards 46.3 g (1.5 mol equivalent) 3-(triethoxysilyl)propyl isocyanate were dropwisely added to the solution within 30 min at this temperature. After addition, the solution was stirred for another 3 h to yield the graft macromer 2.

3) Graft Macromer 3 for Use in Polyesterol Dispersion 100 g of a two-functional polyesterol based on adipic acid, monoethylene glycol and diethylene glycol (OH-value=56 $mg_{KOH}/g_{macromer}$ (determined by DIN 53240), BASF SE) was dried under vacuum (<10 mbar) at 90° C. for 1 h in a Büchi autoclave to remove residual moisture.

The preparation proceeded by addition of 80 ppm dibutyl-tin dilaurate (Trigon Chemie) at 90° C. under constant stirring to form a homogenous mixture. Afterwards 13.0 g (1.5 mol equivalent) 3-(triethoxysilyl)propyl isocyanate were dropwisely added to the solution within 30 min at this temperature. After addition, the solution was stirred for another 3 h to yield the graft macromer 3.

Examples B: Silicon Dioxide/Aluminium Silicate Dispersions in Polyetherol

4. Silicon Dioxide Dispersion in Polyetherol Using Graft Macromer 1

A Büchi autoclave was filled with 193.8 g of a three-functional polyetherol based propylene oxide and a 14 wt % ethylene oxide end-block (OH-value 35 $mg_{KOH}/g_{macromer}$ (determined by DIN 53240) by BASF SE), 50 g silicon dioxide (approximately 99% silicon dioxide, 0.5 to 10 µm (approx. 80% between 1 to 5 µm) CAS 40808-60-7 by Sigma-Aldrich), 6.25 g of Graft macromer 1 and 3 wt % (based on Graft macromer 1) titanium tetraisopropoxide. The reaction mixture was heated to 120° C. under constant stirring (400 rpm) and further heated and stirred for 2 h.

A stable silicon-containing dispersion in polyetherol was yielded with a viscosity of 1334 mPas (25° C. & 100 s$^{-1}$) and a $d_{50}$=2.33 µm.

5) Silicon Dioxide Dispersion in Polyetherol without Graft Macromer (Comparative)

A Büchi autoclave was filled with 320 g three-functional polyetherol based propylene oxide and a 14 wt % ethylene oxide end-block (OH-value 35 $mg_{KOH}/g_{macromer}$ (determined by DIN 53240) by BASF SE) and 80 g silicon dioxide (approximately 99% silicon dioxide, 0.5 to 10 µm (approx. 80% between 1 to 5 µm) CAS 40808-60-7 by Sigma-Aldrich. The reaction mixture was heated to 120° C. under constant stirring (400 rpm) and further heated and stirred for 2 h.

A silicon-containing dispersion in polyetherol was yielded with a viscosity of 1368 mPas (25° C. & 100 s$^{-1}$) and a $d_{50}$=2.48 µm. Precipitation of the dispersed phase was observed in the course of time.

6) Aluminium Silicate Dispersion in Polyetherol Using Graft Macromer 1

A Büchi autoclave was filled with 310 g three-functional polyetherol based propylene oxide and a 14 wt % ethylene oxide end-block (OH-value 35 $mg_{KOH}/g_{macromer}$ (determined by DIN 53240) by BASF SE), 80 g aluminium (sodium) silicate (approximately 81% silicon oxide, particle size $d_{50}$=7 µm; CAS 1344-00-9 Sipernat® 820 A by Evonik Industries), 6.25 g of Graft macromer 1 and 3 wt % (based on Graft macromer 1) titanium tetraisopropoxide. The reaction mixture was heated to 120° C. under constant stirring (400 rpm) and further heated and stirred for 2 h.

A stable silicon-containing dispersion in polyetherol was yielded with a viscosity of 3085 mPas (25° C. & 100 s$^{-1}$) and a $d_{50}$=7.26 µm.

7) Aluminium Silicate Dispersion in Polyetherol Using Graft Macromer 2

A Büchi autoclave was filled with 310 g three-functional polyetherol based propylene oxide and a 14 wt % ethylene oxide end-block (OH-value 35 $mg_{KOH}/g_{macromer}$ (determined by DIN 53240) by BASF SE), 80 g aluminium (sodium) silicate (approximately 81% silicon oxide, particle size $d_{50}$=7 µm; CAS 1344-00-9 Sipernat® 820 A by Evonik Industries), 6.25 g of Graft macromer 2 and 3 wt % (based on Graft macromer 2) titanium tetraisopropoxide. The reaction mixture was heated to 120° C. under constant stirring (400 rpm) and further heated and stirred for 2 h.

A stable silicon-containing dispersion in polyetherol was yielded with a viscosity of 3500 mPas (25° C. & 100 s$^{-1}$) and a $d_{50}$=7.52 µm.

8) Aluminium Silicate Dispersion in Polyetherol without Graft Macromer (Comparative)

A Büchi autoclave was filled with 400 g three-functional polyetherol based propylene oxide and a 14 wt % ethylene oxide end-block (OH-value 35 $mg_{KOH}/g_{macromer}$ (determined by DIN 53240) by BASF SE) and 100 g aluminium (sodium) silicate (approximately 81% silicon oxide, particle size $d_{50}$=7 μm; CAS 1344-00-9 Sipernat® 820 A by Evonik Industries). The reaction mixture was heated to 120° C. under constant stirring (400 rpm) and further heated and stirred for 2 h.

A silicon-containing dispersion in polyetherol was yielded with a viscosity of 3292 mPas (25° C. & 100 s$^{-1}$) and a $d_{50}$=8.31 μm. Precipitation of the dispersed phase was observed in the course of time.

9) Aluminium Silicate Dispersion in Polyesterol Using Graft Macromer 3

A Büchi autoclave was filled with 300 g two-functional polyesterol based on adipic acid, monoethylene glycol and diethylene glycol (OH-value=56 mg$_{KOH}$/g$_{macromer}$ (determined by DIN 53240), BASF SE), 80 g aluminium (sodium) silicate (approximately 81% silicon oxide, particle size $d_{50}$=7 μm; CAS 1344-00-9 Sipernat® 820 A by Evonik Industries), 20 g of Graft macromer 1 and 3 wt % (based on Graft macromer 1) titanium tetraisopropoxide. The reaction mixture was heated to 120° C. under constant stirring (400 rpm) and further heated and stirred for 2 h.

A stable silicon-containing dispersion in polyesterol was yielded with a viscosity of 9998 mPas (45° C. & 100 s$^{-1}$ and a $d_{50}$=9.90 μm).

10) Aluminium Silicate Dispersion in Polyesterol without Using a Graft Macromer (Comparative)

A Büchi autoclave was filled with 400 g two-functional polyesterol based on adipic acid, monoethylene glycol and diethylene glycol (OH-value=56 mg$_{KOH}$/g$_{macromer}$ (determined by DIN 53240), BASF SE) and 100 g silicon dioxide (approximately 99% silicon dioxide, 0.5 to 10 μm (approx. 80% between 1 to 5 μm) CAS 40808-60-7 by Sigma-Aldrich). The reaction mixture was heated to 120° C. under constant stirring (400 rpm) and further heated and stirred for 2 h.

A silicon-containing dispersion in polyesterol was yielded with a viscosity of 9721 mPas (45° C. & 100 s$^{-1}$) and a $d_{50}$=9.84 μm. The dispersion solidified, hence, the stability was tested at 90° C. and precipitation of the dispersed phase was observed.

Examples C: Polyurethanes

11) Polyester-Based Polyurethane Footwear System

The above described polyol (silicon-containing dispersion in polyesterol using Graft macromer 3 of Example 9) was applied in a standard PU-footwear-outsole system. The polyesterol Lupraphen® 5608/1 was replaced by the silicon-containing dispersion in polyesterol using graft macromer 3. The formulation of the polyol mixture is illustrated in Tab. 1:

TABLE 1

| Polyol mixture: | | |
| --- | --- | --- |
| Example | comp. | 11 |
| Lupraphen ® 5608/1 | 46.82 | |
| Si-containing PESOL | | 46.82 |
| Lupraphen ® 5610/1 | 46.82 | 46.82 |
| MEG | 4 | 4 |
| Lupragen ® N 203 | 1.6 | 1.6 |
| Water | 0.1 | 0.1 |
| Basionics LQ 01 | 0.15 | 0.15 |
| Additive A 412 | 0.5 | 0.5 |

The polyol mixture was mixed with a prepolymer (of NCO-content 18.95%) and cast into a footwear mold. After 4 minutes, the foam was demolded and the mechanical properties were measured and compared to those of the standard system (Tab. 2):

TABLE 2

| The mechanical properties of the new system compared to standard system | | |
| --- | --- | --- |
| Example | comp. | 11 |
| Density (g/l) | 900 | 890 |
| Hardness (Shore A) | 57 | 62 |
| Tensile strength (N/mm) | 9.5 | 8.3 |
| Elongation at break (%) | 535 | 527 |
| Tear strength (N/mm) | 21.4 | 20.4 |
| Rebound resilience (%) | 45 | 43 |

Surprisingly, the hardness of the system is increased. This can be useful for increasing of the hardness of the footwear systems for different applications.

Lupraphen® 5608/1: Adipic acid/monoethylene glycol/diethylene glycol,
  Mw 2000 g/mol, OH number 56 mg$_{KOH}$/g
Lupraphen® 5610/1: Dicarboxylic mixture/monoethylene glycol/adipic acid,
  Mw 2000 g/mol, OH number 56 mg$_{KOH}$/g
MEG (chain extender): Monoethylene glycol
Lupragen® N 203: DABCO catalyst (33%) dissolved in monoethylene glycol (67%)
Basionics LQ 01: 1-Ethyl-3-methylimidazolium ethyl sulfate
Additive A 412: Ethoxylated glycerol with an OH number of 270 mg$_{KOH}$/g

The invention claimed is:

1. A dispersion, comprising:
  a graft macromer comprising
    a reaction product of
      at least one macromer which comprises in its structure one or more
      hydroxyl-terminated polyether and/or polyester chains,
    with
      at least one grafting compound which comprises in its structure at least
      one at least monoalkoxylated or at least monohalogenated silyl group
      and at least one alkyl, cycloalkyl or aryl comprising group which is
      reactive towards a hydroxyl group of the at least one macromer,
    reacted with oxidic silicon particles selected from the group consisting of silicon dioxide, silicates, silicic acid and mixtures thereof, in at least one polyol, which is different from the graft macromer,
    wherein the oxidic silicon particles have an arithmetic mean diameter (d) in a range of from 0.5 to 20 μm.

2. The dispersion of claim 1, wherein the oxidic silicon particles have an arithmetic mean diameter (d) in a range of from 1 to 10 μm.

3. The dispersion of claim 1, wherein the at least one polyol is selected from two- to eight-functional polyether polyols and/or polyester polyols having a molecular weight (Mn) of from 500 to 30000 g/mol.

4. The dispersion of claim 1, wherein the oxidic silicon particles are selected from silicon dioxide particles and aluminium silicate particles.

5. The dispersion of claim 1, wherein the at least one macromer is selected from two- to eight-functional polyether polyols and/or polyester polyols having a molecular weight (Mn) of from 500 to 30,000 g/mol.

6. The dispersion of claim 1, wherein the at least one macromer has an OH-value of from 6 to 200 mg KOH/g macromer.

7. The dispersion of claim 1, wherein the at least one grafting compound comprises in its structure at least one methoxy silyl or ethoxy silyl group or at least one chloro silyl group.

8. The dispersion of claim 1, wherein the at least one grafting compound comprises in its structure at least one alkyl, cycloalkyl or aryl comprising isocyanate or epoxide group.

9. The dispersion of claim 8, wherein the at least one grafting compound is a ((tri-C1-12-alkoxy)silyl)C1-12-alkyl isocyanate.

10. A process for preparing the dispersion of claim 1, the process comprising reacting the graft macromer with the oxidic silicon particles in the at least one polyol.

11. The process of claim 10, wherein the reaction is carried out at a temperature in a range of from 0 to 260° C.

12. The process of claim 10, wherein the reaction is carried out in the presence of trans-esterification catalysts.

13. A process for preparing a polyurethane, the process comprising
mixing the dispersion of claim 1 with isocyanate and/or polyisocyanates having at least 1.7 isocyanate groups and,
optionally,
  (a) one or more of further compounds having hydrogen atoms which are reactive towards isocyanates,
  (b) chain extenders and/or crosslinkers,
  (c) catalysts,
  (d) blowing agents and/or additives other than (a), (b), (c) and (d), to obtain a mixture, and
reacting the mixture to form the polyurethane.

14. The process of claim 13, wherein the polyurethane is a polyurethane foam and the mixture comprises blowing agents.

15. The process of claim 13, wherein the polyurethane is a compact polyurethane material.

16. A polyurethane, obtainable by the process of claim 13.

* * * * *